United States Patent [19]
Price et al.

[11] 3,724,811
[45] Apr. 3, 1973

[54] CERAMIC PIPE COUPLING DEVICE

[75] Inventors: William E. Price, Sylvania; Paul W. Dullabaun, Toledo, both of Ohio

[73] Assignee: Owens-Illinois, Inc., Toledo, Ohio

[22] Filed: Oct. 23, 1970

[21] Appl. No.: 83,529

[52] U.S. Cl. .......................... 251/148, 285/DIG. 12
[51] Int. Cl. ........................ F16l 9/10, F16l 23/00
[58] Field of Search .............. 251/148, 151, 152, 368; 285/423, DIG. 12

[56] References Cited

UNITED STATES PATENTS

| | | | |
|---|---|---|---|
| 3,159,377 | 12/1964 | Samour | 251/368 X |
| 1,213,518 | 1/1917 | McEwen | 285/239 X |
| 2,388,633 | 11/1945 | De Woody | 285/423 X |
| 3,212,798 | 10/1965 | Lewis et al. | 285/DIG. 12 |
| 3,332,710 | 7/1967 | Doty | 285/DIG. 12 |
| 3,346,279 | 10/1967 | Stachiw et al. | 285/DIG. 12 |
| 3,419,290 | 12/1968 | Campbell et al. | 285/423 X |
| 3,503,415 | 3/1970 | De Angelis et al. | 251/368 X |
| 3,547,403 | 12/1970 | Graver | 251/368 X |

FOREIGN PATENTS OR APPLICATIONS

| | | | |
|---|---|---|---|
| 1,169,840 | 11/1969 | Great Britain | 285/DIG. 12 |

*Primary Examiner*—William R. Cline
*Attorney*—E. F. Dwyer and E. J. Holler

[57] ABSTRACT

A device for connecting piping parts, such as a pipe section, to a ball valve, in a piping system. The invention comprises, in combination, a glass-ceramic connector having a radially-extending peripheral flange at one end, and a retaining ring of a slightly greater diameter than the connector, the ring having a converse mating portion with the flange, the ceramic connector placed in an abutting relationship with another portion of the piping system, such as a ball valve. The retaining ring is positioned about the peripheral flange of the glass-ceramic connector; a similar connector and ring are positioned on the other end of the piping system, such as a ball valve, and means pressing the ring against the flange portion of the connector so as to hold the ring against a gasket interposed between the ring and the flange of the valve. A peripheral bead at the other end of the connector provides a means for joining the connector to the other parts of a piping system, providing a glass-ceramic path for fluid flows.

1 Claim, 1 Drawing Figure

PATENTED APR 3 1973 3,724,811
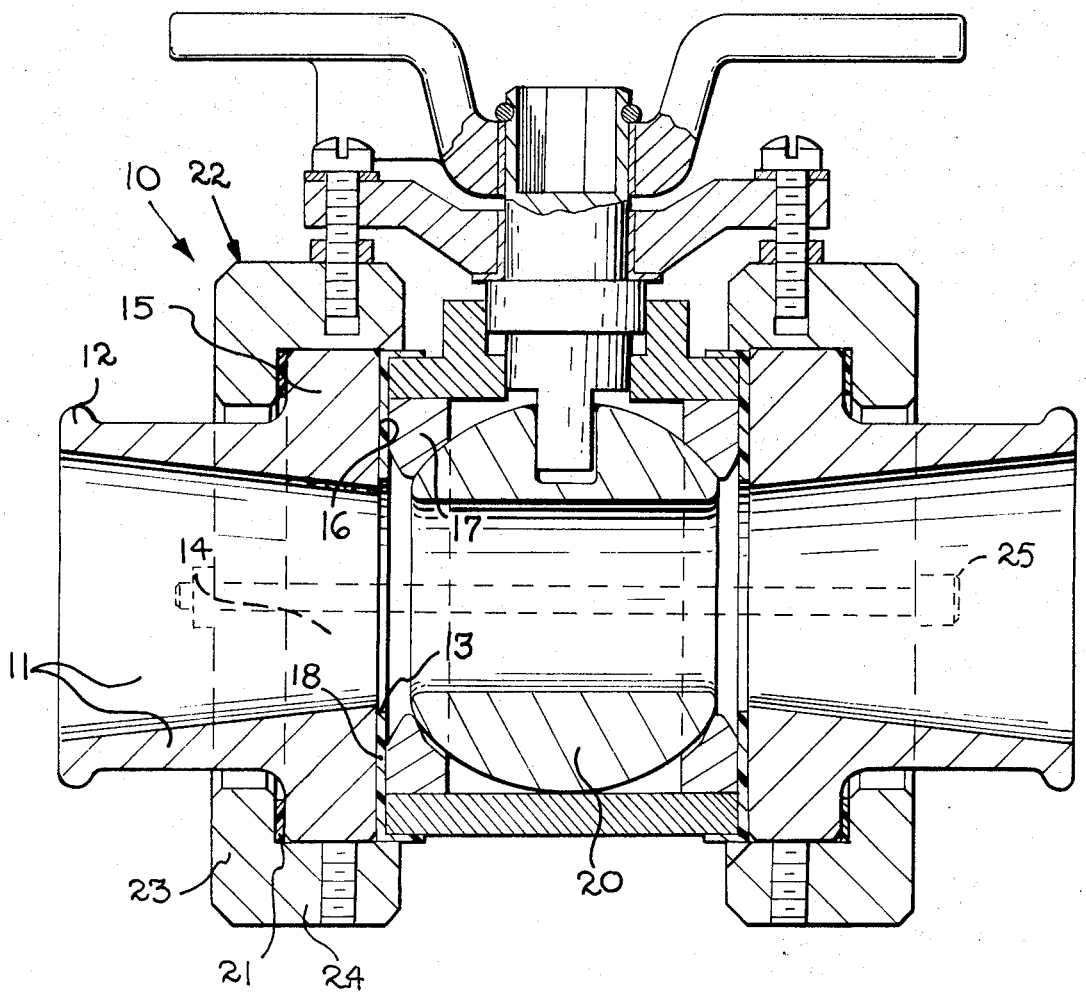
INVENTOR.
PAUL W. DOLLABAUN
BY WILLIAM E. PRICE
E. F. DWYER
E. J. HOLLER
ATTORNEYS

CERAMIC PIPE COUPLING DEVICE

BACKGROUND OF THE INVENTION

1. Field of the Invention

A device for connecting parts of a piping system such as a piping valve to a pipeline. The piping system must have unique characteristics that are desireable for carrying corrosive materials. Such piping systems are of several types. Among them are stainless steel, high-silica iron, glass and glass ceramics. This invention relates to a glass ceramic coupling device which has great utility in a piping system where the nature of the material prohibits a welding, brazing or soldering connection. This connecting device provides a means of inter-connecting pipe parts, such parts being made of glass or a glass ceramic.

2. Description of the Prior Art

It is necessary in a piping system to have control devices such as valves, tees and other conduit parts for diverting and other controlling mechanisms. Leak-proof couplings which are easily inserted in the pipe system are necessary.

This invention provides a means of connecting a glass ceramic conduit to a valve and other pipe parts and providing a continuous glass ceramic pipe system wherein the fluid contacting portions of the system present a continuous glass ceramic surface to the fluid. The prior art coupling systems were deficient in that they required metallic connectors and several additional parts.

SUMMARY OF THE INVENTION

This invention is a device for connecting piping system parts. A glass ceramic connector provides a coupling between parts. The connector has a flange at one end and a bead at another end. A retaining ring fitting over the connector engages the flange of the connector. The ring presses the connector against the mating part, and then provides a ceramic path for the system and a leak-tight joint.

This invention provides a means of connecting a glass ceramic conduit to a valve and provides a continuous glass ceramic pipe system wherein the fluid contacting portions of the system present a continuous glass ceramic surface to the fluid.

BRIEF DESCRIPTION OF THE DRAWING

The FIGURE is a sectioned elevational view of the coupling device of this invention, and a valve assembly.

DESCRIPTION OF THE PREFERRED EMBODIMENTS

The FIGURE is a partial cross-section view of the coupling device of this invention connected with a conventional valve assembly. A better understanding of the invention may be had by referring to the accompanying drawing wherein the FIGURE discloses a valve assembly 10.

A glass ceramic connector 11 is positioned at one side of a valve assembly; a glass ceramic connector may be positioned at the other side also. The connector 11 is an elongated, hollow tubular-shaped conduit. The connector has a bead 12 which encircles one end of the connector at a peripheral edge the bead serves as an anchoring point to permit the connection of the beaded end to another part of a pipe system having a bead, using a standard coupling. The other end of the connector has a flange 14. In cross-section, the elongated flange portion has an axially-extending peripheral portion 15 which has a smooth surface 16 which can be butted against a valve assembly 17. A gasket 18 is positioned between the valve assembly 17 and the end surface of the flange 16. A resilient material 21 is inserted between one surface of the flange 15 and the retaining ring 22 and provides a cushion between the retaining ring 22 and the flange 15. The connecting ring 22 is usually circular in configuration and, referring to FIG. 1, has two portions — an axially-extending circumferential portion 23 and a laterally-extending portion 24. These two portions form an "L" shaped configuration sectioned as shown in FIG. 1, which is contoured to be approximately coextensive with the configuration of a portion of flange 15 of the glass ceramic connector. Positioners, such as a plurality of the tying rods 25 are used to hold two rings against the valve. Other suitable positioning devices may be used, depending upon the system parts being connected:

An assembled piping system will have a pair of ceramic connectors forming an inlet and outlet passageway for a pipeline such as the valve unit shown; the invention may be applied for connection of other line assemblies, such as traps, diverters and the like. In this description, the term "line assembly" includes the connection of any number of piping parts into a fluid conducting system.

Thermally crystallizable glass compounds and methods of crystallizing glass-ceramics therefrom are disclosed in U. S. Pat. application, Ser. No. 630,507, filed Apr. 13, 1967, to Petticrew, Richard W. and subsequently disclosed in corresponding Streamlined Continuation application, Ser. No. 866,168, filed Oct. 13, 1968 now U.S. Pat. No. 3,625,718, issued Dec. 7, 1971.

Examples of a heat-crystallizable glass composition is the following, having this composition in parts by weight as follows:

EXAMPLE I

| | |
|---|---|
| $SiO_2$ | 70.6 |
| $Al_2O_3$ | 19.8 |
| $Li_2O$ | 2.7 |
| $ZnO$ | 1.7 |
| $TiO_2$ | 1.9 |
| $ZrO_2$ | 1.5 |
| $Na_2O$ | 0.5 |
| $K_2O$ | 0.1 |

The mixed ingredients are heated in a suitable gas or electric furnace and brought to the liquid state, which is approximately 3,000° F. The molten material is transferred directly to a mixing vessel and to a suitable mold. The parts are formed, and the molded part is permitted to cool to room temperature. The molded parts are machined to provide desireable, smooth surface for mating with other parts of the system. The formed and machined part is placed in an oven and heated to a final temperature of about 2,000° F. in accordance with a heating schedule as disclosed in application, Ser. No. 886,168 above. The heat treatment is that described in the above disclosed Petticrew Applications, Ser. No. 630,507 et al.

Other examples of a heat-crystallizable glass composition are shown in Table II, and is accompanied by an explanation of the symbols.

The explanation of the symbols in Table II is:
AP = Annealing point temperature
Lg = Temperature at which the logarithm of the glass viscosity in poises is four(4).

TABLE II

COMPOSITION, PARTS BY WEIGHT, AND GLASS PROPERTIES

|  | 1 | 2 | 3 | 4 | 5 | 6 | 7 |
|---|---|---|---|---|---|---|---|
| $SiO_2$ | 70.6 | 70.2 | 69.2 | 69.4 | 68.5 | 69 | 68.2 |
| $Al_2O_3$ | 19.8 | 17 | 17 | 16.9 | 19.1 | 19.6 | 19.4 |
| $Li_2O$ | 3.7 | 3.9 | 3.5 | 3.5 | 3.5 | 3.8 | 3.8 |
| ZnO | 1.7 | 3.5 | 2.2 | 2.2 | 3.1 | 1.6 | 1.6 |
| $TiO_2$ | 1.9 | 1.8 | 1.8 | 1.8 | 1.8 | 1.8 | 1.8 |
| $ZrO_2$ | 1.5 | 1.4 | 1.4 | 1.4 | 1.4 | 1.4 | 1.4 |
| $P_2O_5$ |  | 1.5 | 1.4 | 1.5 | 1.5 | 1.5 | 2.7 |
| MgO |  |  | 2.2 | 2 |  |  |  |
| $Na_2O$ | 0.5 | 0.4 | 0.5 | 0.5 | 0.4 | 0.6 | 0.4 |
| $K_2O$ | 0.1 | 0.2 | 0.2 | 0.2 | 0.2 | 0.3 | 0.2 |
| $Sb_2O_3$ |  | 0.5 | 0.5 | 0.5 | 0.5 | 0.4 | 0.4 |
| F | 0.1 | 0.1 | 0.2 | 0.1 | 0.1 |  |  |
| cl |  |  |  |  |  |  |  |
| CaO |  |  |  |  |  |  |  |
| AP | 1260 | 1150 | 1245 | 1240 | 1225 | 1225 | 1250 |
| Lg = 4 | 2480 | 2470 | 2400 | 2440 | 2450 | 2500 | 2505 |

What is claimed is:

1. A device for interconnecting parts of a glass-ceramic piping system, such as a ball valve, to other parts of said system, comprising:

a. an elongated, hollow glass-ceramic connector, said connector having a flange at the periphery of one end, said flange having a pair of substantially parallel, smooth surfaces extending in a radial plane;

b. the other end of the connector having a radial bead about the periphery thereof;

c. a retaining ring, said ring positioned about the flange and the ring being a converse mating portion to the flange;

d. a resilient material, said material positioned between the connecting ring and the flange;

e. a gasket, said gasket interposed between a second smooth surface of the flange and a surface of the ball valve, said surfaces extending in a radial plane about the longitudinal length of the connector;

f. means for urging the bearing of the ring against said resilient material so as to exert pressure against the resilient material interposed between the ring and a radial surface of the flange and in a direction generally parallel to the longitudinal center line of the connector, thereby positioning the connector against a surface of the gasket interpositioned between the said connector and the ball valve; and g. providing a continuous, glass-ceramic fluid path between the ball valve and any other portion of the glass-ceramic piping system.

* * * * *